(12) United States Patent
Tuluie

(10) Patent No.: US 6,581,711 B1
(45) Date of Patent: Jun. 24, 2003

(54) SUSPENSION ASSEMBLY WITH COMPACT DESIGN WITH LOW CENTER OF GRAVITY APPLICATION

(76) Inventor: Robin Tuluie, 3248 Irving Ave. North, Minneapolis, MN (US) 55412

( * ) Notice: Subject to any disclaimer, the term of this patent is extended or adjusted under 35 U.S.C. 154(b) by 0 days.

(21) Appl. No.: 09/778,483

(22) Filed: Feb. 7, 2001

Related U.S. Application Data

(60) Provisional application No. 60/180,542, filed on Feb. 7, 2000.

(51) Int. Cl.[7] ............................................. B62D 61/02
(52) U.S. Cl. .............................. 180/227; 280/124.128; 280/124.132; 280/128.148; 280/284
(58) Field of Search ................... 280/284, 124.128, 280/124.132, 124.148; 180/227

(56) References Cited

U.S. PATENT DOCUMENTS

| | | | | |
|---|---|---|---|---|
| 4,076,271 A | * | 2/1978 | Doncque | 180/227 |
| 4,457,393 A | * | 7/1984 | Tamaki et al. | 180/227 |
| 4,505,492 A | * | 3/1985 | Tsunoda | 180/227 |
| 4,506,755 A | * | 3/1985 | Tsuchida et al. | 180/227 |
| 4,574,909 A | * | 3/1986 | Ribi | 180/227 |
| 4,582,343 A | * | 4/1986 | Waugh | 180/227 |
| 4,653,604 A | * | 3/1987 | de Cortanze | 180/227 |
| 4,673,053 A | * | 6/1987 | Tanaka et al. | 180/227 |
| 4,724,920 A | * | 2/1988 | Tsuchida et al. | 180/227 |
| 4,753,314 A | * | 6/1988 | Tsukiji | 180/227 |
| 4,765,432 A | * | 8/1988 | Odom | 180/227 |
| 4,789,042 A | * | 12/1988 | Pitts | 180/227 |
| RE34,897 E | * | 4/1995 | Richardson et al. | 180/227 |
| 5,816,357 A | * | 10/1998 | Camlin | 180/227 |
| 5,960,902 A | * | 10/1999 | Mancini et al. | 180/227 |
| 6,098,736 A | * | 8/2000 | Smith | 180/227 |

FOREIGN PATENT DOCUMENTS

| | | | |
|---|---|---|---|
| JP | 02081787 | * | 3/1990 |
| JP | 02254087 | * | 10/1990 |

* cited by examiner

Primary Examiner—Brian L. Johnson
Assistant Examiner—Deanna Draper
(74) Attorney, Agent, or Firm—Westman, Champlin & Kelly, P.A.

(57) ABSTRACT

A vehicle suspension assembly having a compact design and low center of gravity application. The suspension assembly includes a first link arm including a plurality of spaced pivot interfaces. A second link arm is coupled to a second pivot interface of the first link arm spaced from a first pivot interface adapted to coupled to a swing arm assembly. A shock absorber is coupled to the first link arm at a third pivot interface which is spaced from the first and second pivot interfaces with the second pivot interface positioned between the first and third pivot interfaces and the second link arm and shock absorber are coupled to a vehicle frame in stacked relation to provide a suspension assembly with a low center of gravity and small moment of inertia for moving linkages.

17 Claims, 7 Drawing Sheets

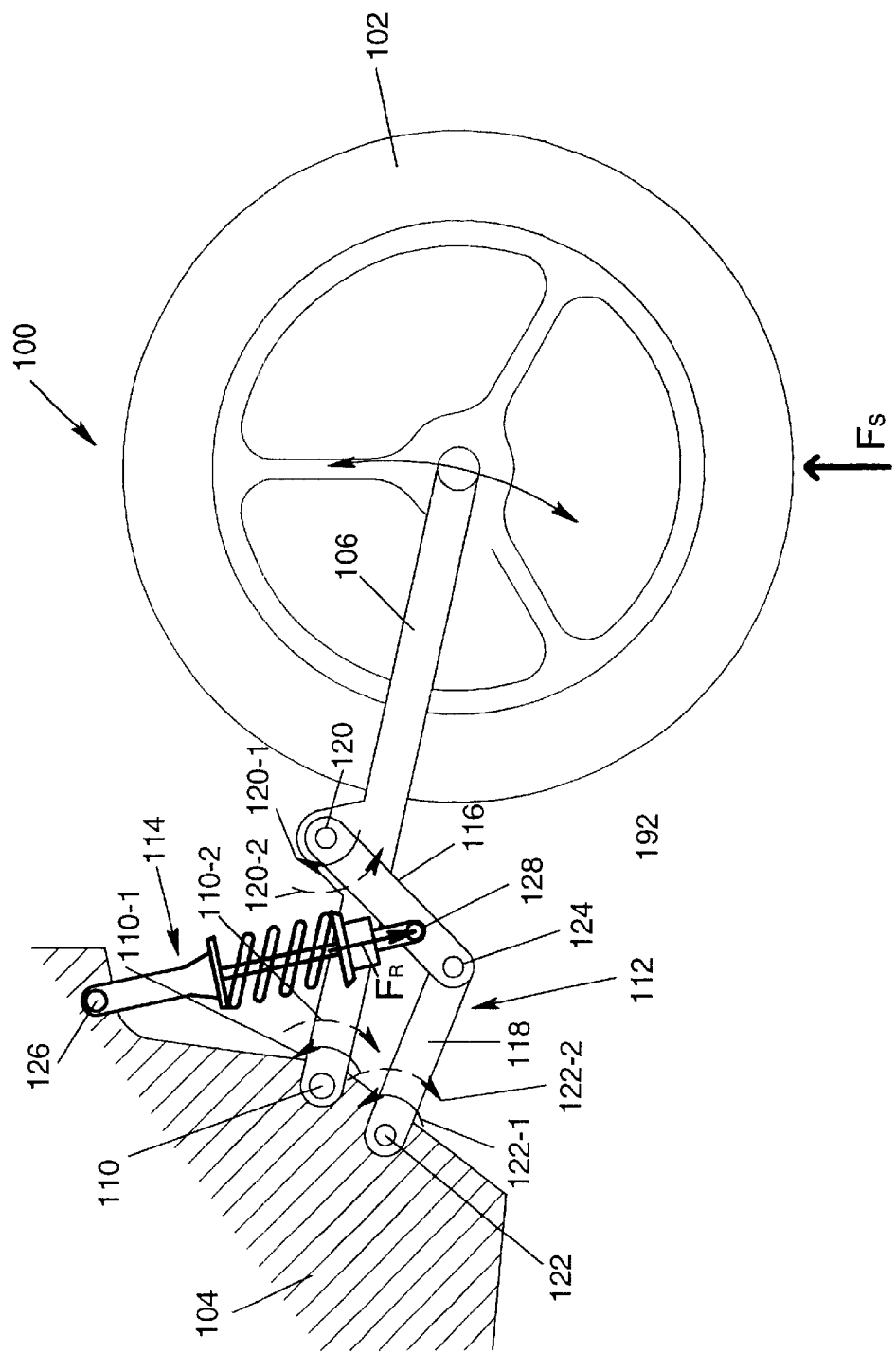

SUSPENSION ASSEMBLY WITH COMPACT DESIGN WITH LOW CENTER OF GRAVITY APPLICATION

The present application claims priority to U.S. provisional application Serial No. 60/180,542, filed Feb. 7, 2000, the content of which is hereby incorporated by reference in its entirety.

BACKGROUND OF THE INVENTION

The present invention relates to a suspension system. In particular, the present invention relates to a suspension system having particular application for a motorcycle.

Motorcycle suspension flexibly support a wheel of a motorcycle over rough terrain and during maneuvers and cornering. Motorcycle designs are demanding more reactive response during corner or maneuvering events. This enhanced performance demands a low center of gravity and compact assembly to provide quick inertia response for varied terrain and enhanced maneuverability. The present invention address these and other problems.

SUMMARY OF THE INVENTION

The present invention relates to a vehicle suspension assembly having a compact design and low center of gravity application. The suspension assembly includes a first link arm including a plurality of spaced pivot interfaces. A second link arm is coupled to a second pivot interface of the first link arm spaced from a first pivot interface adapted to coupled to a swing arm assembly. A shock absorber is coupled to the first link arm at a third pivot interface which is spaced from the first and second pivot interfaces with the second pivot interface positioned between the first and third pivot interfaces and the second link arm and shock absorber are coupled to a vehicle frame in stacked relation to provide a suspension assembly with a low center of gravity and small moment of inertia for moving linkages

BRIEF DESCRIPTION OF THE DRAWINGS

FIG. 1 illustrates a suspension assembly of the prior art.

FIGS. 2-1 and 2-2 illustrate an embodiment of a suspension assembly of the present invention.

DETAILED DESCRIPTION OF THE PREFERRED EMBODIMENTS

Figures 1, 2:
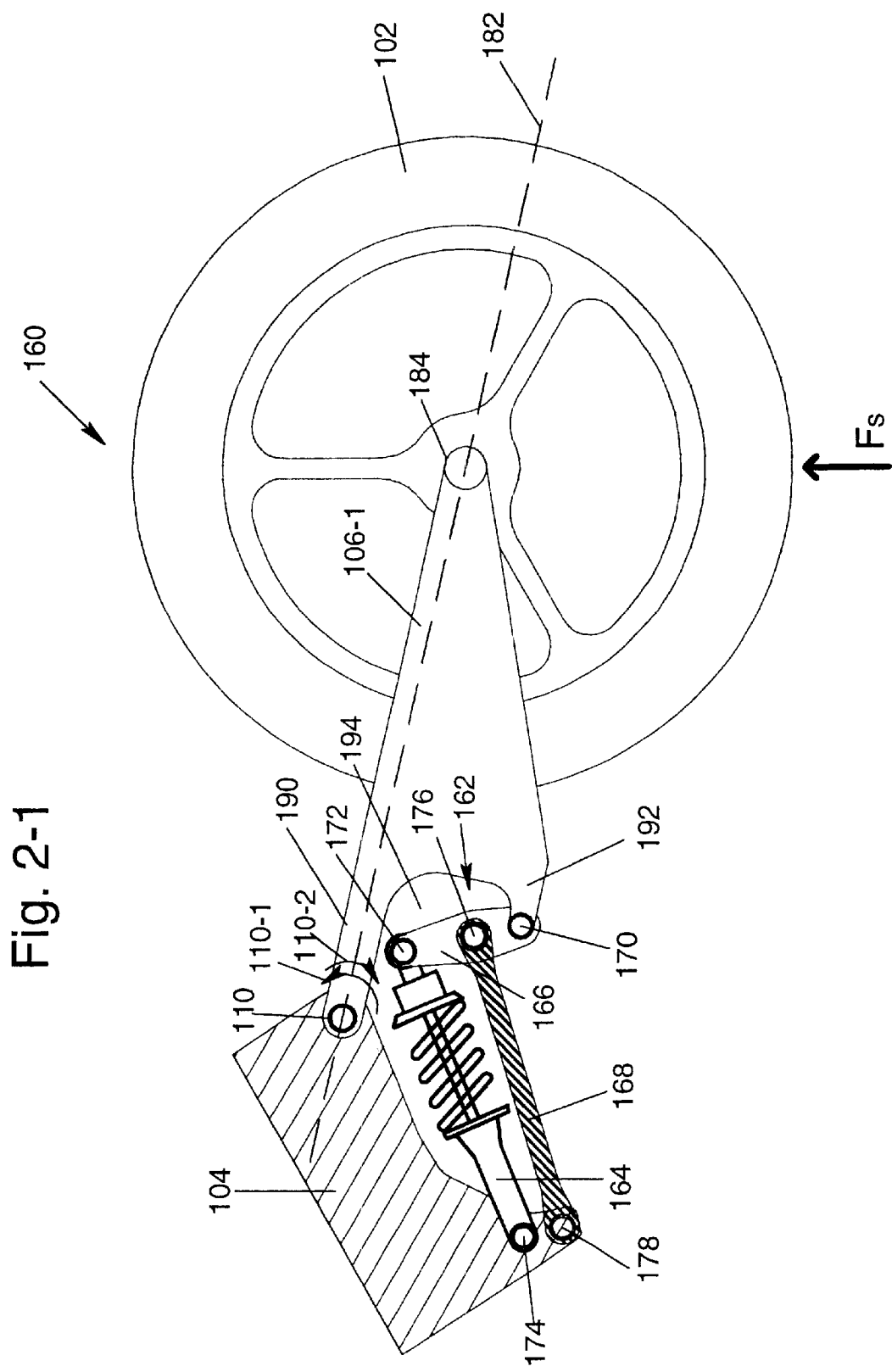
Figure 2:
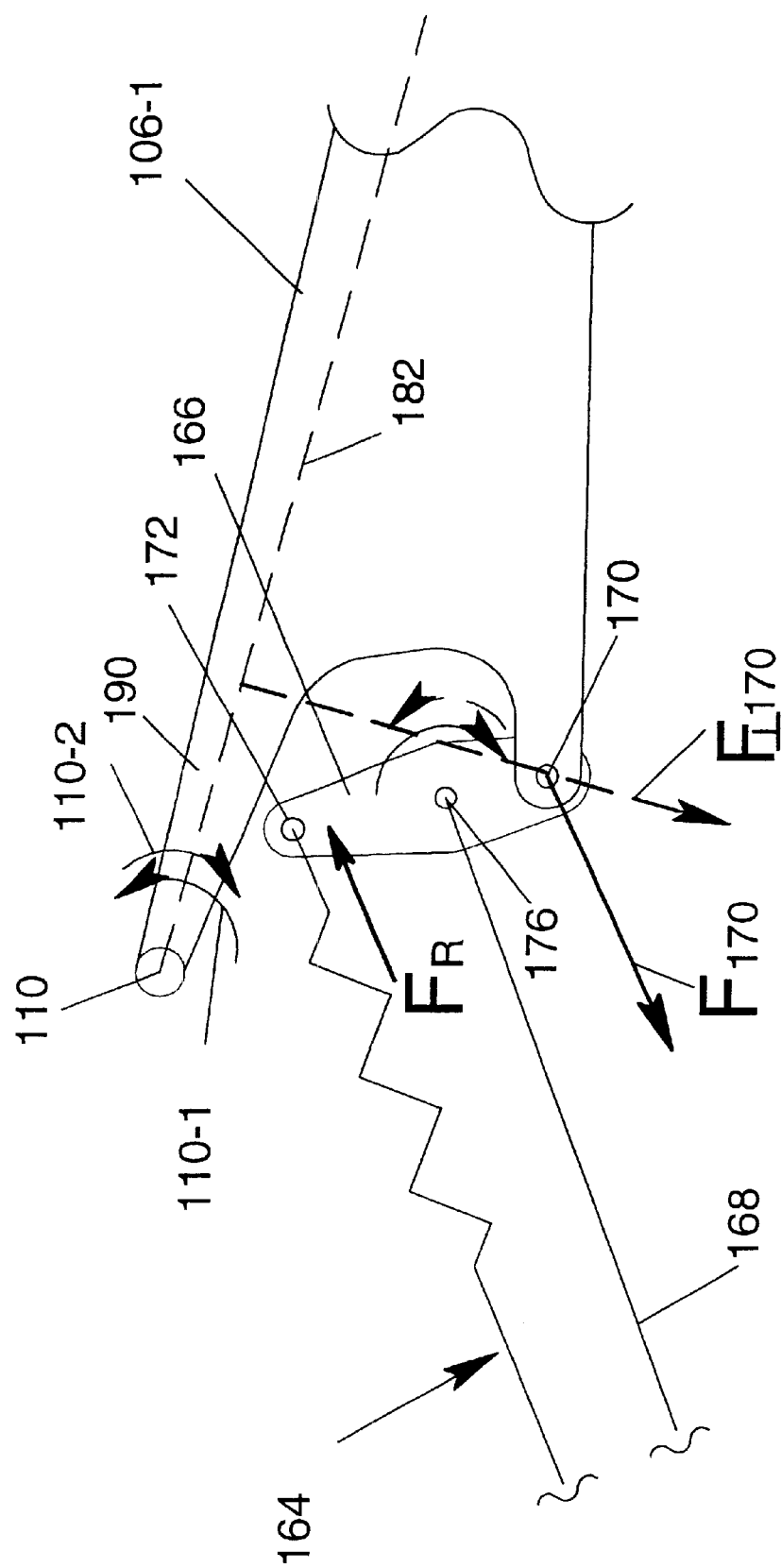

Suspension systems are designed to flexibly support a vehicle relative to a wheel assembly. FIG. 1 illustrates an example embodiment of a suspension for a rear wheel assembly 100 of a motorcycle. The wheel assembly 100 includes a wheel 102 pivotally supported relative to a chassis or frame 104 by a swing arm 106 pivotally coupled to chassis 104 at pivot 110.

A suspension assembly is operably coupled to the swing arm 106 supporting the wheel assembly. The suspension assembly includes a linkage assembly 112 and a shock absorber 114. The linkage assembly includes first and second link arms 116, 118. The first link arm 116 is coupled to swing arm 106 at pivot 120 and the second link arm 118 is connected to chassis 104 at pivot 122. The link arms 116, 118 are pivotally connected to one another at pivot 124. The shock absorber 114 is supported relative to the chassis 104 at pivot 126 and is coupled to the linkage assembly 112 at pivot 128 as shown.

During operation of the vehicle, a shock force $F_s$ can be imparted to the wheel 102 as illustrated by arrow $F_s$. Application of force $F_s$ to the wheel 102 as shown causes the swing arm 106 to rotate about pivot 110 as illustrated by arrow 110-1 Rotation of the swing arm 106 as illustrated by arrow 110-1 causes the link arms 116, 118 of the linkage assembly to rotate as illustrated by arrows 120-1, 122-1.

The shock absorber 114 of the suspension assembly reacts to the rotational movement imparted to the swing arm 106 through the wheel assembly. The shock absorber 114 supplies a reactive force $F_r$ to counter rotation of the swing arm 106 about pivot 110 and rotation of the link arms 116, 118 about pivots 120, 122. As shown, the shock absorber 114 is connected to the linkage assembly 112 to supply a perpendicular force component spaced from pivot 110 for the swing arm 106 and perpendicular force components spaced from pivots 120, 122 for the link arms 116, 118 in a direction which counters rotation 110-1, 120-1, 122-1 as illustrated by arrows 110-2, 120-2, 122-2.

Design and assembly of the illustrated suspension assembly having a shock absorber which opposes rotation of the link arms and swing arm imposes certain design limitations and assembly constraints. Motorcycle design demands higher performance alternatives. To enhance cornering and responsiveness, a lower center of mass is desired. However, limitations of the operational design of the suspension components restricts lower center mass designs for wheel suspension assemblies. In addition fewer rotating components, or similarly smaller angles of rotation are desirable from the point of view of reducing the inertia associated with moving elements of the linkage.

The present invention relates to a suspension design which provides design alternates for lowering the center of mass of the vehicle as well as the inertia of the moving linkages and provides advantages over prior suspensions. FIGS. 2-1 and 2-2 illustrate one embodiment of a suspension assembly 160 of the present invention where like numbers are used to identify like parts in the previous FIG. The suspension assembly 160 provides suspension support for rotation of swing arm 106-1 about pivot 110 in response to shock force $F_s$.

As shown, suspension assembly 160 includes a linkage assembly 162 and shock absorber 164. In the embodiment shown, linkage assembly 162 includes a first link arm 166 and a second link arm 168. Link arm 166 is connected to swing arm 106-1 at pivot 170 spaced from pivot 110. Shock absorber 164 is connected to link 166 at pivot 172 spaced from pivot 170 and coupled to chassis at pivot 174. Link arm 168 is connected to link arm 166 at pivot 176 between pivots 170, 172 as shown and coupled to chassis at 178.

As previously described, application of $F_s$ to wheel 102 rotates swing arm 106-1 about pivot 110 as illustrated by arrow 110-1. Rotation of swing arm 106-1 about pivot 110 imparts translational force to link arm 166 at pivot 170 which is restricted by link arm 168 so that link arm 166 rotates about pivot 170, 176. Rotation of the link arm 166 at pivot 176 compresses or activates the shock absorber 164.

As shown in FIG. 2-2, shock absorber 164 supplies a reactive force $F_r$ at pivot 172. The reactive force $F_r$ supplies a counter force $F_{170}$ at pivot 170 through pivot 176. Reactive force $F_{170}$ has a component perpendicular to the elongated axis 182 of the swing arm 106-1 through pivot 110. The perpendicular component of counter force $F_{170}$ as shown counters rotation of swing arm 106-1 about pivot 110 as illustrated by arrow 110-2. Also, reactive force $F_r$ from the shock absorber 164 counters rotation of link arm 166 about pivot 176.

Thus, as described, link arm 168 limits translational movement of link arm 166 via rotation of swing arm 106-1 about pivot 110 so that link arm 166 rotates about pivot 176 and shock absorber 164 is coupled to link arm 166 and swing arm 106-1 to counter rotation of link arm 166 about pivot 170 and swing arm 106-1 about pivot 110. As shown, rotation of the link arm 168 relative to the chassis 104 is not countered via the shock absorber 164 allowing placement of the link arm 168 and shock absorber 164 in stacked relation without a perpendicular force component $F_r$ to the link arm 168. This stacked relation of the link arm 168 and shock absorber 164 provides a compact assembly which is mounted below elongated axis 182 of the swing arm 106-1 to provide a low center of mass and small moment of inertia of the moving linkages.

For operation, link arm 168 can be pivotally connected to chassis 104 at point 178 as shown in FIG. 2-1, or alternatively can be rigidly connected to the chassis 104. The relatively rigid connection of link arm 168 to chassis 104 at point 178 defines a pivot 176 having a relatively fixed position in contrast to floating point connections between link arms of the prior art.

In the embodiment shown, swing arm 106-1 includes a generally "V" shaped structure forming chassis portion 190 connected to pivot 110, an arm portion 192 and a cavity or space 194 formed therebetween. Link arm 166 is connected to arm portion 192 at pivot 170 and extends into cavity or space 194 for connection to link arm 168 and shock absorber 164 below the elongated axis 182 of swing arm 106-1 to provide a lower center of mass for the suspension assembly 160 as described.

Figure 3:
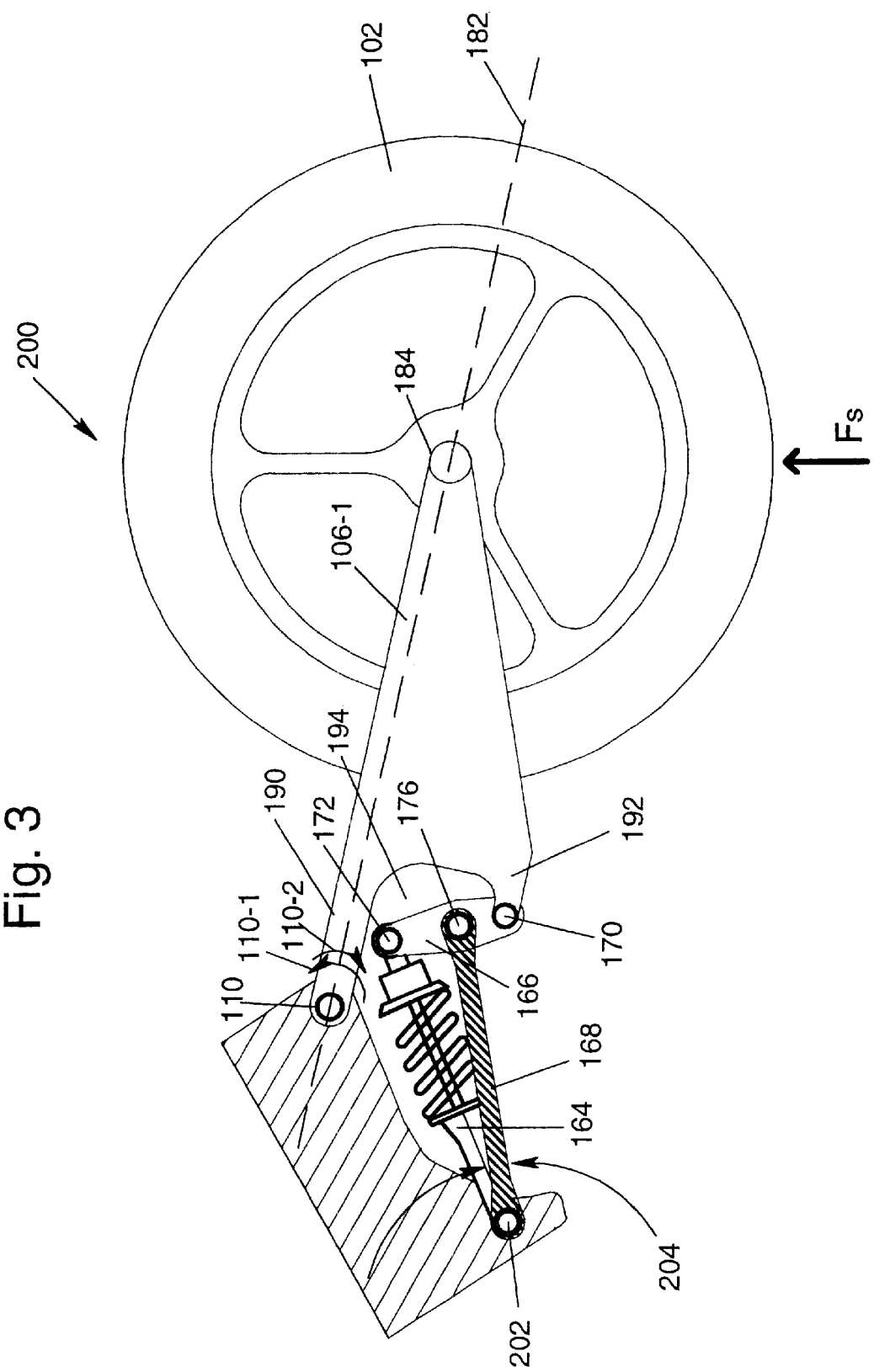
FIG. 3 illustrates an alternate embodiment of a suspension assembly of the present invention.

In the embodiment of FIGS. 2-1, 2-2 points 174, 178 for attachment of shock absorber 164 and link arm 168 to chassis 104 are generally vertically spaced. Also in the embodiment shown, points 174, 178 are offset horizontally. FIG. 3 illustrates an alternate embodiment of a suspension assembly 200 of the present invention where like numbers are used to refer to like parts. In the embodiment shown, shock absorber 164 and link arm 168 are coupled to chassis 104 at a connection point 202 having a common axis and the shock absorber 166 and link arm 168 extend from point 202 to form an angle 204 between the shock absorber 164 and link arm 168. The suspension assembly of the present invention can be adapted for different suspension applications. In particular, pivot 176 can be adjusted to adjust the distance between pivot 170 and pivot 176 to adjust wheel travel relative to shock absorber 164 travel to provide desired suspension resistance.

Figure 4:
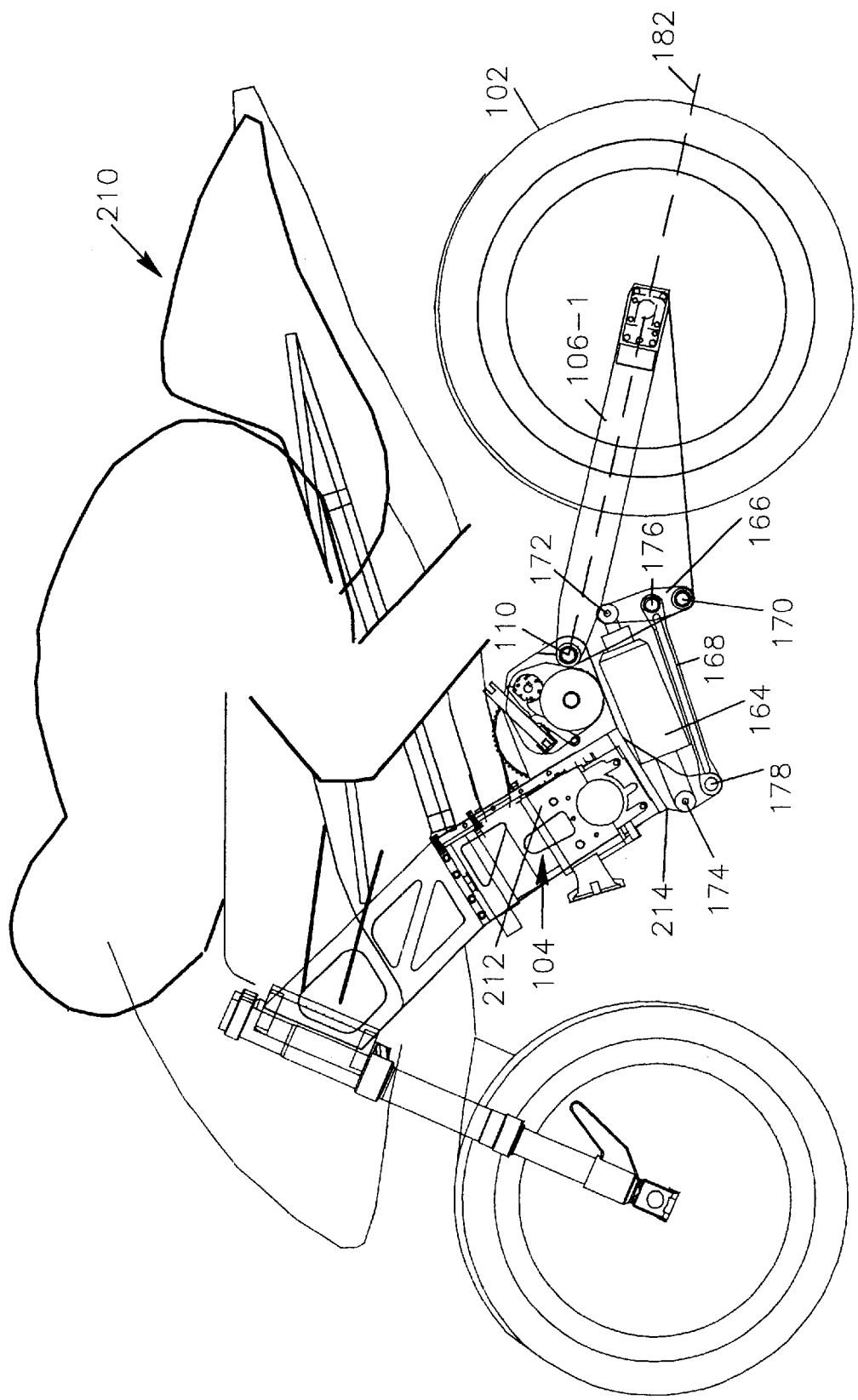
FIG. 4 illustrates an embodiment of the suspension assembly of the present invention on a motorcycle.

FIG. 4 illustrates an embodiment of the suspension assembly of the present invention incorporated into a motorcycle 210. As shown, suspension linkages 166, 168 and shock absorber 164 are supported below engine casing 212 and swing arm 106-1 for a low center of mass and low moving mass. As shown, connections 174, 178 for shock absorber 164 and link arm 168 are formed on a suspension block 214 mounted to the engine casing 212 or frame of the vehicle. As shown, shock absorber 164 is supported is out of the exhaust and engine heat flow path for optimum performance and reliability.

Figure 5:
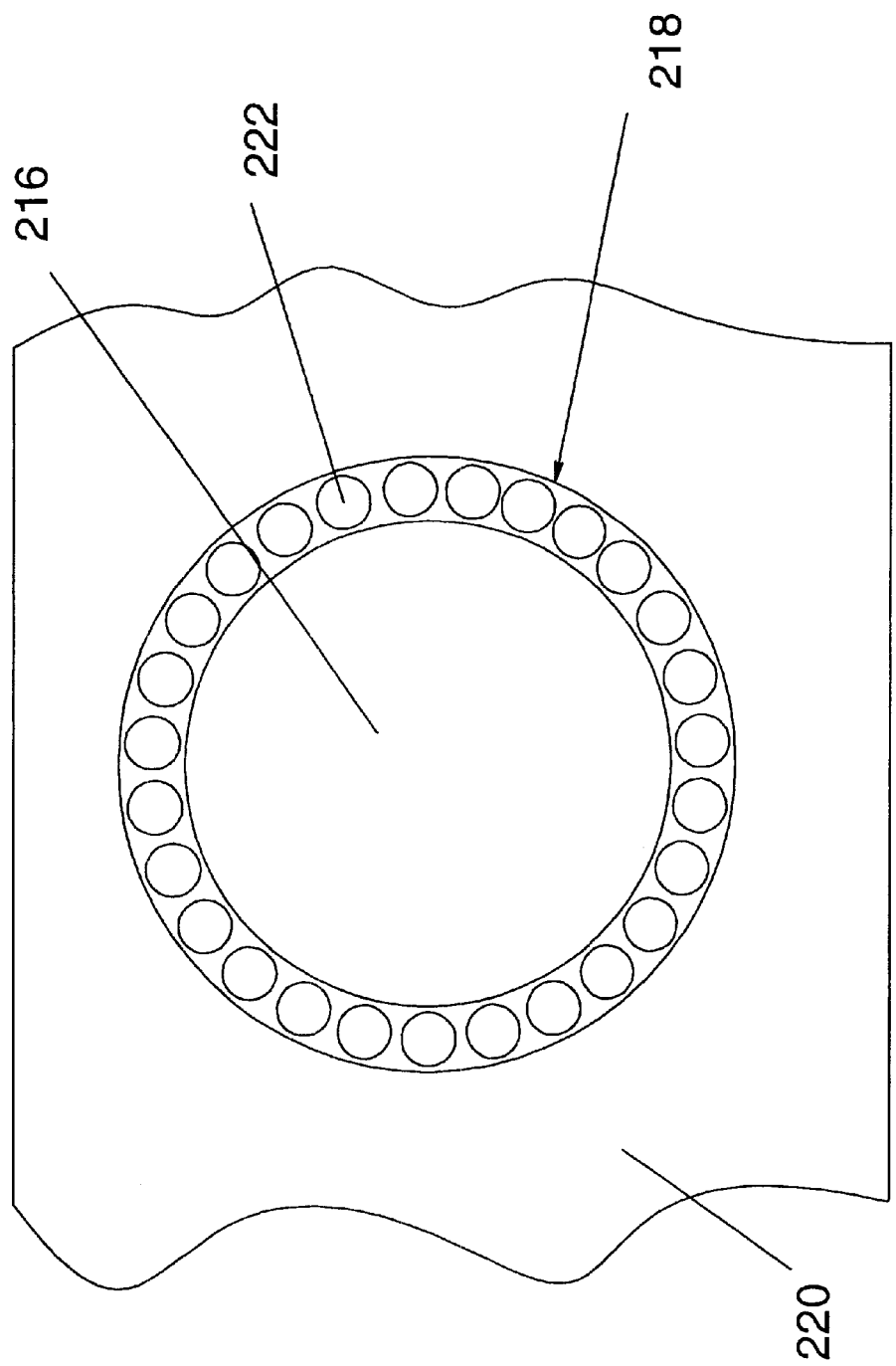
FIG. 5 schematically illustrates a pivot interface for coupling suspension linkages and components.

FIG. 5 illustrates pivot interfaces for pivots 170, 172, 174, 176 including a shaft 216 supported for rotation in opening 218 of an outer member 220 by bearings 222. Alternatively outer member 220 can rotate about shaft 216 via bearings 222 to cooperatively form pivots 170, 172, 174, 176 to pivotally couple link arms 166, 168 and shock absorber 164 as described.

Figure 6:
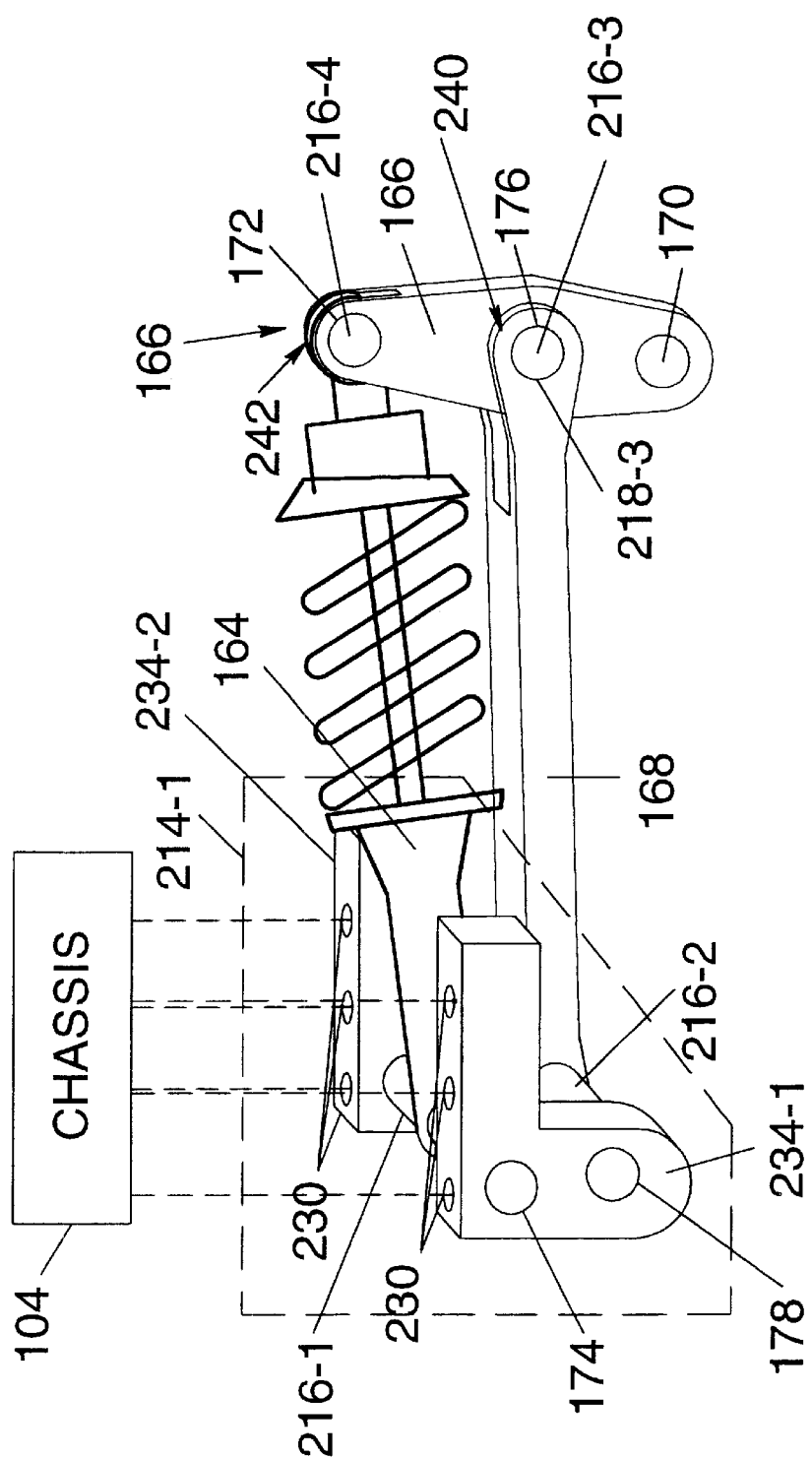
FIG. 6 illustrates an embodiment of a suspension assembly having a suspension linkage and shock absorber mounted to a suspension block connectable to a vehicle chassis.

FIG. 6 illustrates a suspension assembly having a shock absorber 164 and link arm 168 coupled to a suspension block 214-1 having fastener openings 230 adapted to couple to the chassis 104. As shown, block 214-1 includes shafts 216-1, 216-2 rotationally supported relative to block 214-1. As shown, shock absorber 164 and link arm 168 are fixed to shafts 216-1, 216-2 between block portions 234-1, 234-2 to form pivots 178, 176 shown in FIGS. 2-4. Although link arm 168 is shown pivotally connected to suspension block 214-1, it should be understood that link arm 168 can be bolted to block 214-1. In such arrangement, link arm 168 is sufficiently flexible along its length to flex upon application of force introduced during operation of the suspension assembly. Alternatively, shock absorber 164 and link arm 168 can be rotationally coupled to shafts 216-1, 216-2 fixed to block 214-1 to provide a rotational connection at pivots 178, 176.

As previously described, shock absorber 164 and link arm 168 pivotally couple to link arm 166 to form pivots 172, 174. As shown, link arm 168 includes a forked end 240 having openings 218-3 adapted for insertion of a shaft 216-3 rotationally coupled to arm 166. Link arm 166 includes a forked end 242 supporting a rotating shaft 216-4 and shock absorber 164 is fixedly secured to rotating shaft 216-4 to form pivot 174. Alternatively, shock absorber 164 and link arms 168 can be rotationally coupled to a shaft 216 fixedly supported by link arm 166 and it should be understood that the invention is not limited to the particular rotational connections described.

Although the present invention has been described with reference to preferred embodiments, workers skilled in the art will recognize that changes may be made in form and detail without departing from the spirit and scope of the invention.

What is claimed is:

1. A suspension assembly comprising:
    a first link arm having a first pivot interface;
    a second link arm coupled to the first link arm at a second pivot interface spaced from the first pivot interface; and
    a shock absorber coupled to the first link arm at a third pivot interface spaced from the first and second pivot interfaces with the second pivot interface being positioned between the first and third pivot interfaces and the shock absorber and second link arm being interfaced to the first link arm at the third and second pivot interfaces and being in stacked alignment so that the shock absorber supplies a reactive force having a perpendicular force component relative to the first link arm and not the second link arm to rotate the first link arm about the second pivot interface.

2. The suspension assembly of claim 1 and further comprising:
    a suspension block adapted to couple to a vehicle chassis and the second link arm and shock absorber are operably coupled to the suspension block and supported thereby.

3. The suspension assembly of claim 2 wherein the second link arm and shock absorber are coupled to the suspension block at vertically spaced positions.

4. The suspension assembly of claim 2 wherein the second link arm is fixedly coupled to the suspension block.

5. The suspension assembly of claim 2 wherein the shock absorber and second link arm are coupled to the suspension block at a common axis.

6. The suspension assembly of claim 2 wherein the second link arm is pivotally connected to the suspension block.

7. The suspension assembly of claim 2 wherein the suspension block includes a plurality of fastener openings adapted for connection to a vehicle chassis.

8. The suspension assembly of claim 1 wherein the first pivot interface on the first link arm is adapted to coupled to a swing arm supporting a vehicle wheel.

9. The suspension assembly of claim 1 wherein the shock absorber and the second link arm are in parallel alignment.

10. The suspension assembly of claim 1 wherein the shock absorber and second link arm are in non-parallel alignment.

11. In combination:
   a vehicle chassis;
   a first link arm having a first pivot interface;
   a second link arm having a first end coupled to the first link arm at a second pivot interface spaced from the first pivot interface and a second end coupled to a vehicle chassis; and
   a shock absorber having a first end coupled to the first link arm at a third pivot interface spaced from the first and second pivot interfaces with the second pivot interface being positioned between the first and third pivot interfaces and a second end coupled to the vehicle chassis and the second link arm and shock absorber being in stacked alignment so that shock absorber is aligned with the first link arm to supply a reactive force at the third pivot interface to pivot the first link arm about the second pivot interface to counteract rotation of the first link arm about the first pivot interface and stacked relative to the second link arm so that a reactive force supplied does not impart a counter-rotation to the second link arm at the second end of the second link arm coupled to the vehicle chassis.

12. The combination of claim 11 including a suspension block adapted to coupled to the vehicle chassis and the second ends of the shock absorber and second link arm are coupled to the vehicle chassis through the suspension block.

13. The combination of claim 11 wherein the second link arm is fixed to the vehicle chassis.

14. The combination of claim 11 wherein the second link arm is pivotally connected to the vehicle chassis.

15. The combination of claim 11 wherein the second ends of the shock absorber and second link arm are coupled to the vehicle chassis below a swing arm supporting a wheel relative to the vehicle chassis.

16. The combination of claim 15 wherein the swing arm includes a "V" shaped portion having a first portion pivotally coupled to the vehicle chassis and a second portion and a space between the first and second portions and the first pivot interface of the first link arm is coupled to the second portion and the first link arm extends therefrom in the space between the first and second portions of the swing arm.

17. A vehicle comprising:
   a swing arm having a first end pivotally connected to a vehicle chassis and a second end coupled to a wheel and an elongated extent therebetween;
   a suspension assembly including first and second link arms and a shock absorber and the first link arm is coupled to the swing arm at a first pivot interface and the second link arm is coupled to the first link arm at a second pivot interface and the shock absorber is coupled to the first link arm at a third pivot interface spaced from the first and second pivot interfaces and the second pivot interface is between the first and third pivot interfaces with the second link arm and shock absorber coupled the vehicle chassis below an elongated axis of the swing arm.

* * * * *

UNITED STATES PATENT AND TRADEMARK OFFICE
CERTIFICATE OF CORRECTION

PATENT NO. : 6,581,711 B1
DATED : June 24, 2003
INVENTOR(S) : Tutuie

It is certified that error appears in the above-identified patent and that said Letters Patent is hereby corrected as shown below:

Title page,
Item [56], References Cited, insert:
-- OTHER PUBLICATIONS
Mechanism Design, Third Edition, pp. 86-87, published by Prentice Hall, 1997 by Erdman et al. --.

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,581,711 B1
DATED : June 24, 2003
INVENTOR(S) : Tuluie

It is certified that error appears in the above-identified patent and that said Letters Patent is hereby corrected as shown below:

<u>Title page,</u>
Item [56], References Cited, insert -- OTHER PUBLICATIONS,
Mechanism Design, Third Edition, pp. 86-87, published by Prentice Hall, 1997 by Erdman et al. --; insert -- Sheet 1 - prior art --.

<u>Column 1,</u>
Line 15, change "suspension" to -- suspensions --.
Line 35, after "pivot" delete "interfaces and the", and insert -- interfaces. The --.

<u>Column 2,</u>
Line 14, insert -- . -- after "110-1".

<u>Column 3,</u>
Line 16, insert -- , 176 -- after "170".

<u>Column 4,</u>
Line 18, after "pivots" delete "178;176", and insert -- 174, 178 --.
Line 25, after "pivots" delete "178,176", and insert -- 174, 178 --.
Line 27, after "127," delete "174", and insert -- 176 --.
Line 33, after "pivot" delete "174", and insert -- 172 --.
Lines 52, 62 and 66, insert -- the -- after "and".

<u>Column 5,</u>
Lines 4, 17, 32 and 33, insert -- the -- after "and".
Line 38, change "a" to -- the --.

UNITED STATES PATENT AND TRADEMARK OFFICE
CERTIFICATE OF CORRECTION

PATENT NO.   : 6,581,711 B1
DATED        : June 24, 2003
INVENTOR(S)  : Tuluie

It is certified that error appears in the above-identified patent and that said Letters Patent is hereby corrected as shown below:

Column 6,
Lines 5, 12 and 35, insert -- the -- after "and".

Signed and Sealed this

Seventh Day of June, 2005

JON W. DUDAS
*Director of the United States Patent and Trademark Office*